US012709916B2

(12) United States Patent
Gordon

(10) Patent No.: US 12,709,916 B2
(45) Date of Patent: Aug. 18, 2026

(54) MAGNETIC LOCKING MECHANISM FOR A COMPUTING DEVICE ENCLOSURE

(71) Applicant: Microsoft Technology Licensing, LLC, Redmond, WA (US)

(72) Inventor: Michael Cameron Gordon, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 413 days.

(21) Appl. No.: 18/451,039

(22) Filed: Aug. 16, 2023

(65) Prior Publication Data

US 2025/0059799 A1 Feb. 20, 2025

(51) Int. Cl.
*E05B 47/00* (2006.01)
*G06F 1/16* (2006.01)

(52) U.S. Cl.
CPC ........ *E05B 47/004* (2013.01); *E05B 47/0045* (2013.01); *G06F 1/1679* (2013.01)

(58) Field of Classification Search
CPC ............. E05B 15/0073; E05B 47/0038; E05B 47/004; E05B 47/0043; E05B 47/0045; E05B 73/0017; E05B 73/0023
See application file for complete search history.

(56) References Cited

U.S. PATENT DOCUMENTS 3,967,480 A 7/1976 Stackhouse
4,223,799 A * 9/1980 Eyster ................ B60K 15/0406 70/276
4,489,842 A 12/1984 Bobrove
5,405,037 A * 4/1995 Piron ..................... B65D 50/06 220/230
5,602,530 A * 2/1997 Holmgren ........... E05B 73/0017 340/572.1
5,996,831 A 12/1999 Teok
(Continued)

FOREIGN PATENT DOCUMENTS

CN 115917103 A * 4/2023 ............. E05C 19/16

OTHER PUBLICATIONS

"Application as Filed in U.S. Appl. No. 18/335,752", filed Jun. 15, 2023, 38 Pages.

(Continued)

*Primary Examiner* — Christine M Mills
*Assistant Examiner* — Yahya Sidky
(74) *Attorney, Agent, or Firm* — Holzer Patel Drennan

(57) ABSTRACT

The presently disclosed magnetic locking mechanism(s) for a computing device enclosure is directed at providing a fast, but tamper resistant solution for assembly and disassembly of a computing device having top and base enclosures that come together to form an overall enclosure for the computing device. Top and base enclosures that incorporate one or more of the presently disclosed magnetic locking mechanisms are capable of being quickly and easily attached and detached without damaging the computing device, so long as a correct magnetic key(s) are used. This aids both repairability and upgradability of the computing device during its life cycle, as well as recyclability at the end of its life cycle. Without the correct magnetic key(s), it is difficult to separate the enclosures without damaging one or both of the enclosures.

20 Claims, 9 Drawing Sheets

(56) References Cited

U.S. PATENT DOCUMENTS

| | | | | |
|---|---|---|---|---|
| 6,604,643 | B1 * | 8/2003 | Michael | B65D 50/067 215/253 |
| 6,912,878 | B2 * | 7/2005 | Belden, Jr. | E05B 73/0041 70/57.1 |
| 7,004,340 | B2 * | 2/2006 | Belden, Jr. | B65D 55/14 215/293 |
| 7,570,161 | B2 * | 8/2009 | Necchi | B65D 50/067 340/568.1 |
| 7,866,497 | B2 * | 1/2011 | Belden, Jr. | E05B 73/0041 215/316 |
| 8,317,048 | B2 * | 11/2012 | Hajichristou | B65D 43/0225 220/230 |
| 8,636,167 | B2 * | 1/2014 | Hajichristou | B65D 50/061 220/230 |
| 9,273,494 | B2 * | 3/2016 | Fontana | E05B 47/0038 |
| 2004/0163430 | A1 * | 8/2004 | Belden, Jr. | E05B 73/0017 70/57.1 |
| 2024/0419219 | A1 * | 12/2024 | Tomky | G06F 1/1679 |
| 2025/0212343 | A1 * | 6/2025 | Gordon | H05K 5/0208 |

OTHER PUBLICATIONS

"Application as Filed in U.S. Appl. No. 18/337,961", filed Jun. 20, 2023, 32 Pages.

* cited by examiner

MAGNETIC LOCKING MECHANISM FOR A COMPUTING DEVICE ENCLOSURE

BACKGROUND

It is increasingly important to build low cost and sustainable computing devices that deliver a high degree of cosmetic performance. Many existing computing devices rely on screwed or snapped connections for final assembly, such as placing a cover on a device body of the computing device.

SUMMARY

Implementations described and claimed herein provide a computing device comprising a base enclosure including a round exterior perimeter and an interior recess and a top enclosure including a round interior perimeter fit over the base enclosure. The base enclosure further includes two or more base linear locking features arranged about the exterior perimeter of the base enclosure and a base rotational magnetic locking feature also arranged about the exterior perimeter of the base enclosure. The round exterior perimeter of the base enclosure encircles the round interior perimeter of the top enclosure. The top enclosure further includes two or more top linear locking features arranged about the interior perimeter of the top enclosure. The top linear locking features selectively engage with the base linear locking features to prevent the top enclosure from lifting linearly away from the base enclosure at a locked rotational orientation of the top enclosure with reference to the base enclosure. A top rotational magnetic locking feature selectively engages with the base rotational magnetic locking feature to selectively prevent the top enclosure from rotating with reference to the base enclosure.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Screwed connections are often time consuming to effect and yield exposed fasteners in the end product that may be unsightly and/or encourage tampering (e.g., removal by a non-authorized user). Snapped connections may be faster than screwed connections to effect, but can be difficult to undo without damaging the cover or the device body, even by an authorized user (e.g., to conduct authorized repairs). Further, snapped connections may be similarly unsightly and/or encourage tampering to screwed connections. Both screwed and snapped connections may provide an obvious access point, which can encourage unauthorized tampering and attempted disassembly.

The presently disclosed technology is directed at providing a fast, but tamper resistant solution for assembly and disassembly of a computing device having top and base enclosures that come together to form an overall enclosure for the computing device. Top and base enclosures that incorporate one of the presently disclosed magnetic locking mechanisms are capable of being quickly and easily attached (e.g., during initial or repaired end product assembly) and detached (e.g., to conduct authorized repairs) without damaging the computing device, so long as a correct magnetic key(s) are used. This aids both repairability and upgradability of the computing device during its life cycle, as well as recyclability at the end of its life cycle. Without the correct magnetic key(s), it is difficult to separate the enclosures without damaging one or both of the enclosures. Further, the presently disclosed magnetic locking mechanisms are fully hidden from view in the assembled end product, thereby discouraging tampering (e.g., removal by a non-authorized user).

Some existing devices incorporate an over-molded or adhered finishing cover to conceal unsightly snapped or screwed connections. However, this additional component adds expense and may reduce the recyclability of an end product by making top and base enclosures more difficult to separate from one another. By making the presently disclosed magnetic locking mechanisms fully hidden from view in the assembled end product, an over-molded or adhered finishing cover is unnecessary and can be omitted. This avoids the additional expense of a finishing cover, as well as the reduced recyclability of an end product that incorporates a finishing cover. Further, existing screwed or snapped connections often suffer from rattling due to assembly tolerances that may change or even grow over time, particularly as the computing device is handled roughly. Specifically, screwed connections may become inadvertently loosened and/or materials used in device body, cover and/or snap connection therebetween may shrink and/or become more brittle over time.

Figure 1:
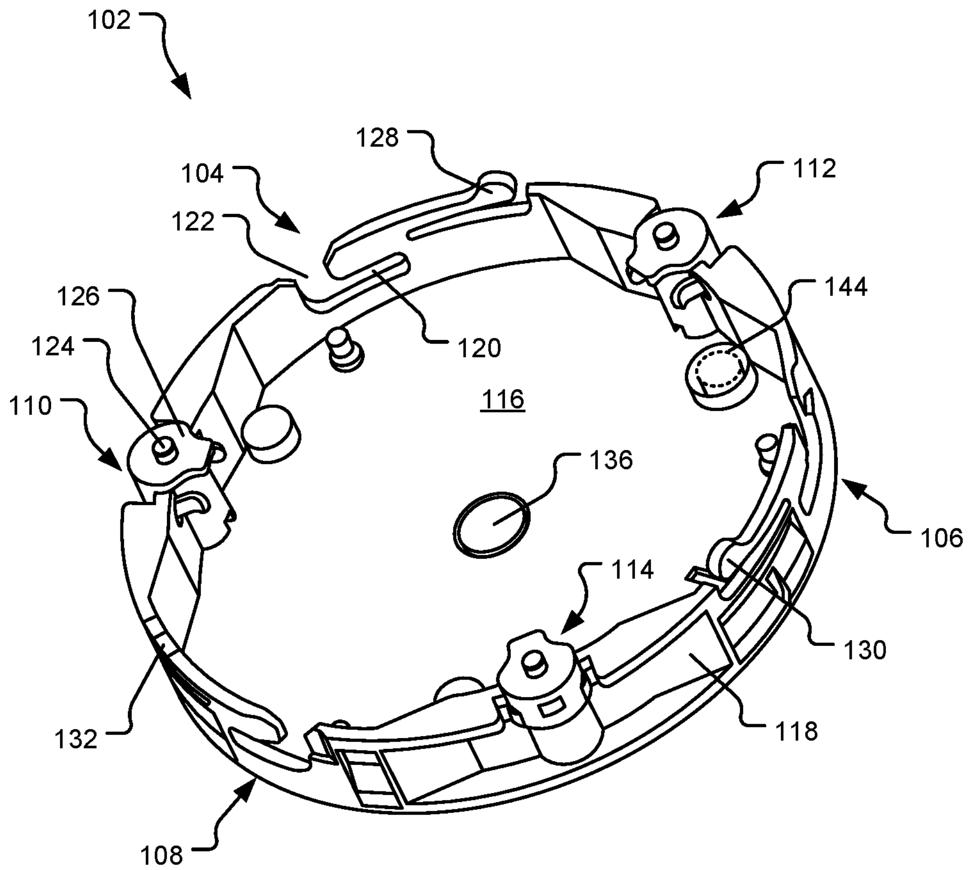
FIG. 1 illustrates an example base enclosure for a computing device that adopts linear locking features and rotational magnetic locking features.

FIG. 1 illustrates an example base enclosure 102 for a computing device (not shown, see e.g., computing device 400 of FIG. 4) that adopts base linear locking features 104, 106, 108 and base rotational magnetic locking features 110, 112, 114. The base enclosure 102 in combination with a top enclosure (not shown, see e.g., top enclosure 452 of FIGS. 4A&4B) serves as a housing for the computing device. A central cavity 116 in the base enclosure 102 encloses a variety of internal components that render the computing device functional as such. The base enclosure 102 is generally cylindrical with an open end that is covered when the top enclosure is attached (or responsive at least to attachment of the top enclosure) to the base enclosure 102. The top enclosure is selectively attached to the base enclosure 102 in order to secure the internal components within the central cavity 116 and seal the interior of the computing device from external contamination. The resulting computing device is round sleek puck form factor. An example implementation may be 50-150 mm in diameter and 15-25 mm in height.

Side wall 118 of the generally cylindrically-shaped base enclosure 102 may overlap partially or entirely with a corresponding side wall of a generally cylindrically-shaped top enclosure. This overlap may improve the seal between the base enclosure 102 and the top enclosure and/or increase the resistance of the base enclosure 102 from being pried apart from the top enclosure using brute force.

The computing device may be any sort of computing device (e.g., a tablet computer, laptop computer, personal computer, gaming device, smart phone, or any other discrete device that receives physical user inputs and carries out one or more sets of arithmetic and/or logical operations), an input device for a computing device (e.g., a handheld controller, keyboard, trackpad, or mouse), or a device that is not necessarily related to computing at all (e.g., vehicle components, consumer electronics (e.g., cameras, telephones, and home appliances), medical devices, and industrial or commercial machinery) that has internal components sealed by the base enclosure 102 in combination with the top enclosure.

The base linear locking features 104, 106, 108 are each used in conjunction with corresponding top linear locking features in the top enclosure (e.g., see top linear locking features 480, 482 in top enclosure 452 of FIG. 4). The base linear locking features 104, 106, 108 each includes a circumferential slot (e.g., circumferential slot 120) in the round exterior perimeter of the of the base enclosure 102 extending along a portion of the side wall 118 and an access point (e.g., access point 122) to the circumferential slot. As discussed in further detail below, the top linear locking features each include a pin protruding inward from the round interior perimeter of the side wall of the top enclosure. Each pin protruding from the top enclosure engages with one of the circumferential slots in the base enclosure 102 in a locked rotational orientation (see e.g., the locked orientation depicted in FIGS. 5A and 5B, discussed below). In an unlocked rotational orientation of the top enclosure with reference to the base enclosure 102, each pin is free to exit its circumferential slot via its access point. In the unlocked rotational orientation, the top enclosure is free to be selectively lifted linearly away from the base enclosure 102 as mating surfaces and tolerances therebetween the base and top enclosures may only permit linear movement.

The disclosed linear locking features are technically advantageous over other locking features in that they provide a simple twist-lock function to the base enclosure 102 and the top enclosure without occupying much space within the central cavity 116 as the base linear locking features 104, 106, 108 are arranged about the side wall 118. The exterior perimeter positioning of the circumferential slots and corresponding pins protruding from the top enclosure are technically advantageous in that they leave more space available for the internal components that render the computing device functional as compared to other solutions that adopt slots and/or pins that are more centrally located within the computing device.

The base rotational magnetic locking features 110, 112, 114 are each used in conjunction with corresponding top rotational magnetic locking features in the top enclosure (e.g., see top rotational magnetic locking features 486, 488, 490 in top enclosure 452 of FIG. 4). The base rotational magnetic locking features 110, 112, 114 each include a spring-loaded magnetic pin (e.g., magnetic pin 124) that is spring-biased to the depicted protruding orientation with reference to a surrounding pin housing (e.g., pin housing 126). The top rotational magnetic locking features each comprise a seat in the top enclosure for one of the spring-loaded magnetic pins. In a locked rotational orientation, each of the spring-loaded magnetic pins selectively engages with one of the seats in the top enclosure to prevent the top enclosure from rotating with reference to the base enclosure. The spring-loaded magnetic pins are magnetically disengaged (e.g., via a repelling force applied by top key 560 of FIG. 5) from their respective seats to permit the top enclosure to rotate with reference to the base enclosure and move to an unlocked rotational orientation. The disclosed rotational magnetic locking features are technically advantageous over other rotational locking features in that they provide a simple magnetically actuated function that selectively locks or unlocks the twist-lock function of the aforementioned linear locking features, using one or both of a top key and a bottom key, each of which are described in further detail below. This is also accomplished without occupying much space within the central cavity 116 as the base rotational magnetic locking features 110, 112, 114 are arranged about the side wall 118. This leaves more space available for the internal components that render the computing device functional.

The base enclosure 102 further includes anti-rattle features 128, 130, 132 that protrude upward from the base enclosure 102 to meet the top enclosure when the top enclosure is placed (or responsive at least to placement of the top enclosure) on the base enclosure 102. The anti-rattle features 128, 130, 132 are spring-loaded (here, depicted as a plastic tab that resiliently deflects), thereby closing a tolerance and applying a separation force between the base enclosure 102 and the top enclosure that reduces or prevents any rattling caused by fit tolerances between the base enclosure 102 and the top enclosure. Use of the anti-rattle features 128, 130, 132 is technically advantageous in that it reduces the perception by the user that the computing device is made up of two separate enclosures, the base enclosure 102 and the top enclosure. This can improve the user experience by suggesting tighter tolerances, and thus a higher quality computing device. This can further reduce the likelihood of a user forcibly attempting to separate the base enclosure 102 from the top enclosure without use of the proper magnetic key as those components seem less likely to be successfully separated.

A bottom key magnet 136 is centrally located in a bottom of the base enclosure 102. The base key magnet 136 is used to selectively attach a bottom key (not shown, see e.g., bottom key 234 of FIG. 2) to a bottom-side of the base enclosure 102. Bottom key alignment apertures (e.g., aperture 144, illustrated in broken lines as it is hidden from view) in the bottom-side of the base enclosure 102 allow the bottom key to be rotationally indexed to the base enclosure 102. Inclusion and use of the bottom key magnet 136 and key alignment apertures is technically advantageous is that it aids a use in attaching the bottom key to the base enclosure 102.

Figure 2:
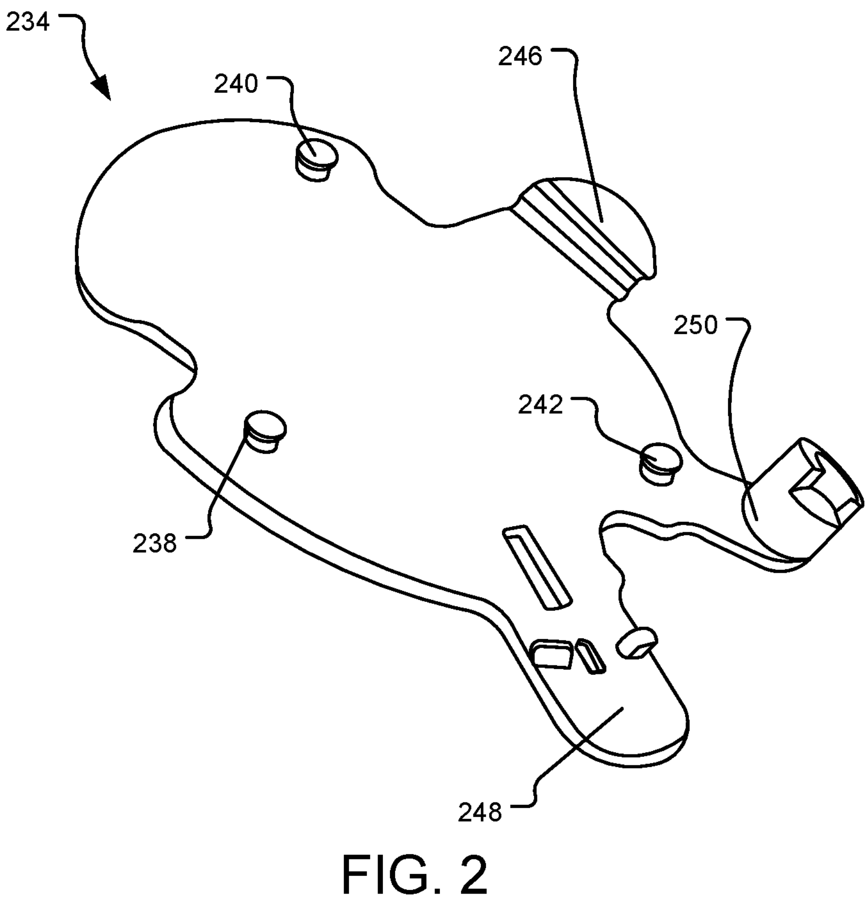
FIG. 2 illustrates an example bottom key for a base enclosure.

FIG. 2 illustrates an example bottom key 234 for a base enclosure (not shown, see e.g., base enclosure 102 of FIG. 1). The base enclosure is fit to a top enclosure and selectively locked to form a computing device. The bottom key 234 is a generally planar component that is selectively attached to a bottom-side of the base enclosure. The bottom key 234 is magnetically attracted to a bottom key magnet (e.g., bottom key magnet 136 of FIG. 1) embedded within the base enclosure. The bottom key 234 may be either ferromagnetic (e.g., steel) or incorporates a similar magnet itself to provide the attraction. While the bottom key magnet holds the bottom key 234 against the bottom-side of the base enclosure, it does not rotationally position the bottom key 234 with reference to the base enclosure. Alignment protrusions 238, 240, 242 align with and seat within bottom key alignment apertures (e.g., aperture 144 of FIG. 1) in the bottom-side of the base enclosure to rotationally index the bottom key 234 to the base enclosure.

Handles 246, 248 are arranged at a perimeter of the bottom key 234 that allow a user to hold the base enclosure rotationally in place, particularly while a top enclosure (not shown, see e.g., top enclosure 452 of 4) is manipulated to move between locked and unlocked rotational orientations. A rotational stop 250 is also arranged at the perimeter of the bottom key 234 to provide a visual and/or tactile rotational alignment tool so that an associated top key (not shown, see e.g., top key 560 of FIG. 5) is rotationally aligned in a manner that unlocks base rotational magnetic locking features (not shown, see e.g., base rotational magnetic locking features 110, 112, 114 of FIG. 1) from corresponding top rotational magnetic locking features (not shown, see e.g., top rotational magnetic locking features 486, 488, 490 in top enclosure 452 of FIG. 4).

Figure 3:
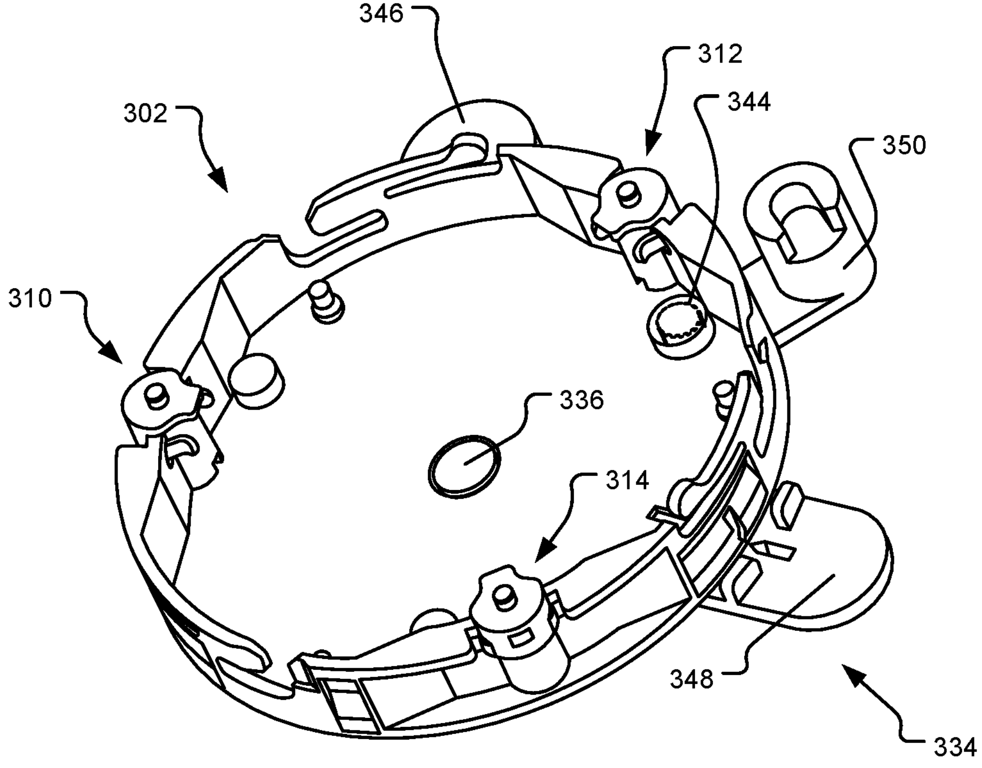
FIG. 3 illustrates an example base enclosure with an example bottom key attached.

FIG. 3 illustrates an example base enclosure 302 with an example bottom key 334 attached. The bottom key 334 is a generally planar component that is selectively attached to a bottom-side of the base enclosure 302. The bottom key 334 is magnetically attracted to bottom key magnet 336 embedded within the base enclosure 302. The bottom key 334 may be either ferromagnetic (e.g., steel) or incorporates a similar magnet itself to provide the attraction. While the bottom key magnet 336 holds the bottom key 334 against the bottom-side of the base enclosure 302, it does not rotationally position the bottom key 334 with reference to the base enclosure 302. Alignment protrusions (not shown, see e.g., alignment protrusions 238, 240, 242 of FIG. 2) align with and seat within bottom key alignment apertures (e.g., aperture 344, illustrated in broken lines as it is hidden from view) in the bottom-side of the base enclosure 302 to rotationally index the bottom key 334 to the base enclosure 302.

Handles 346, 348 are arranged at a perimeter of the bottom key 334 that allow a user to hold the base enclosure 302 rotationally in place, particularly while a top enclosure (not shown, see e.g., top enclosure 452 of FIG. 4) is manipulated to move between locked and unlocked rotational orientations. A rotational stop 350 is also arranged at the perimeter of the bottom key 334 to provide a visual and/or tactile rotational alignment tool so that an associated top key (not shown, see e.g., top key 560 of FIG. 5) is rotationally aligned in a manner that unlocks base rotational magnetic locking features 310, 312, 314 from corresponding top rotational magnetic locking features (not shown, see e.g., top rotational magnetic locking features 486, 488, 490 in top enclosure 452 of FIG. 4).

Figure 4A:
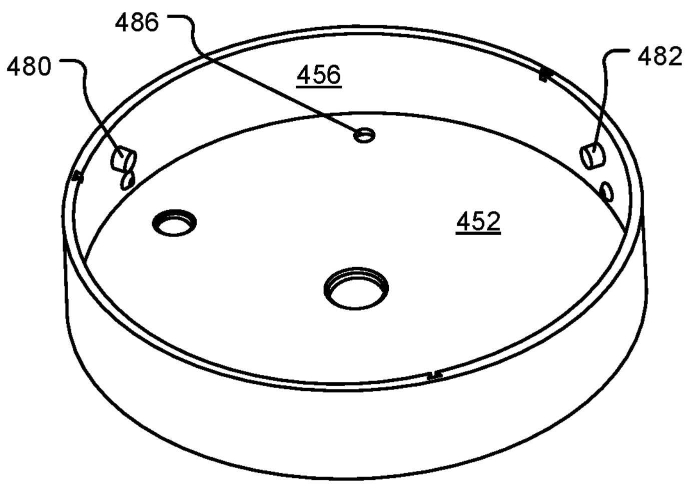
FIG. 4A illustrates an underside of an example top enclosure.

FIG. 4A illustrates an underside of an example top enclosure 452. The top enclosure 452 adopts linear locking features and rotational magnetic locking features that are intended to selectively interface with corresponding linear locking features and rotational magnetic locking features in a base enclosure (not shown, see e.g., base enclosure 102 of FIG. 1). More specifically, top linear locking features (e.g., top linear locking features 480, 482 are each used in conjunction with corresponding base linear locking features in the base enclosure (e.g., see base linear locking features 104, 106 in base enclosure 102 of FIG. 1).

Figure 6:
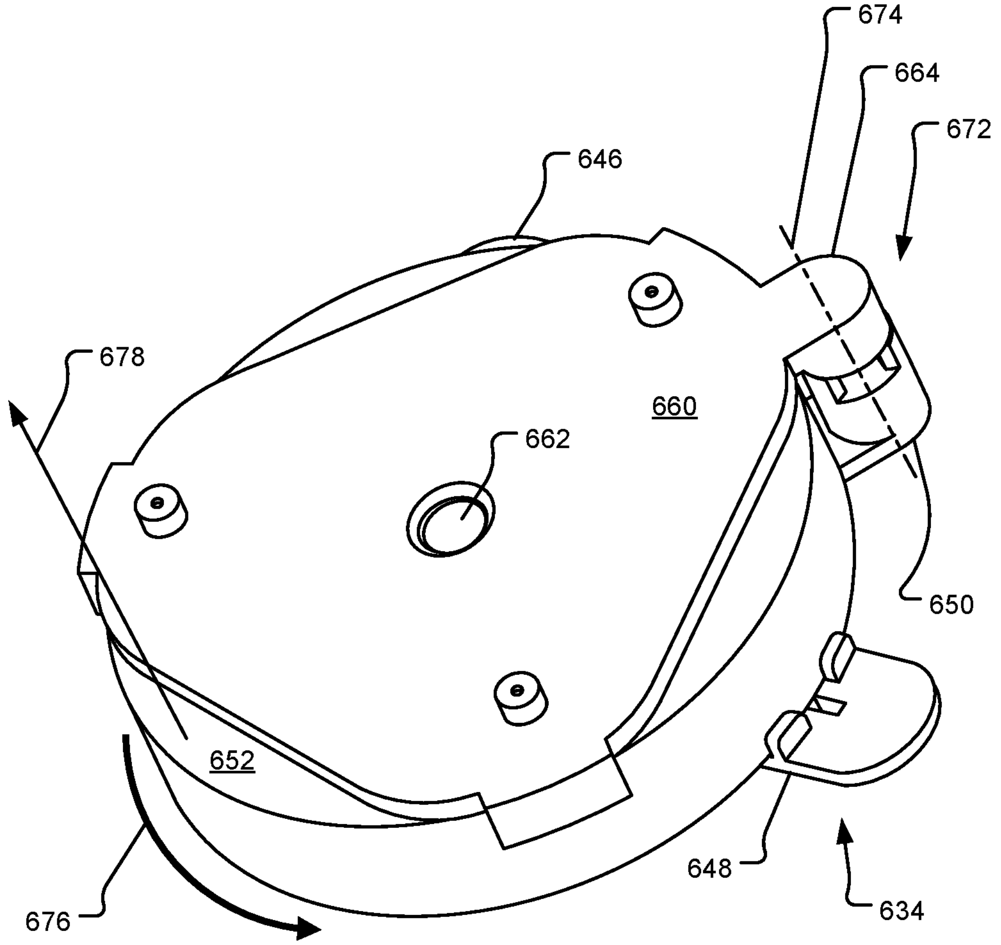
FIG. 6 illustrates an example top key aligned over a top enclosure that unlocks the top enclosure from an underlying base enclosure and rotation of the top enclosure from a locked rotational orientation to an unlocked rotational orientation with reference to the underlying base enclosure.

The top linear locking features each include a pin protruding inward from the round interior perimeter of the side wall 456 of the top enclosure 452. Each pin protruding from the top enclosure 452 engages with a circumferential slot (e.g., circumferential slot 120 of FIG. 1) in a base enclosure (e.g., base enclosure 102 of FIG. 1) in a locked rotational orientation. In an unlocked rotational orientation of the top enclosure 452 with reference to the base enclosure, each pin is free to exit its circumferential slot via an access point. In the unlocked rotational orientation, the top enclosure 452 is free to be selectively lifted linearly away from the base enclosure 102 (as illustrated in FIG. 6) or placed linearly upon the base enclosure 102 (as illustrated in FIG. 4B), and as discussed below.

Top rotational magnetic locking features (e.g., top rotational magnetic locking feature 486) are each used in conjunction with corresponding base rotational magnetic locking features in the base enclosure (e.g., see base rotational magnetic locking feature 112 in base enclosure 102 of FIG. 1). The top rotational magnetic locking features each include a seat in the top enclosure 452 for a spring-loaded magnetic pin protruding from the base enclosure (e.g., base enclosure 102 of FIG. 1). In a locked rotational orientation, each of the spring-loaded magnetic pins selectively engages with one of the seats in the top enclosure 452 to prevent the top enclosure 452 from rotating with reference to the base enclosure. The spring-loaded magnetic pins are magnetically disengaged (e.g., via a repelling force applied by a top key (e.g., top key 560 of FIG. 5) from their respective seats to permit the top enclosure 452 to rotate with reference to the base enclosure and move between locked and unlocked rotational orientations.

Figure 4B:
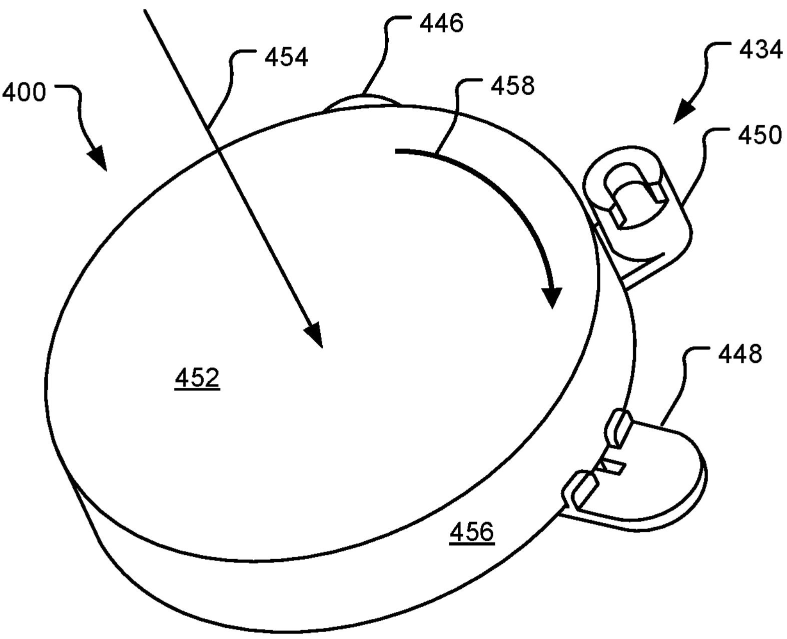
FIG. 4B illustrates an example top enclosure placed and locked over a base enclosure to form a computing device that adopts linear locking features and rotational magnetic locking features.

FIG. 4B illustrates the example top enclosure 452 placed and locked over a base enclosure (not shown, see e.g., base enclosure 102 of FIG. 1) to form a computing device 400 that adopts linear locking features and rotational magnetic locking features. The top enclosure 452 is linearly placed onto the base enclosure, as illustrated by arrow 454. The top enclosure 452 is rotated with reference to the base enclosure such that pins protruding inward from the round interior perimeter of side wall 456 of the top enclosure enter access points (not shown, see e.g., access point 122 of FIG. 1) for circumferential slots (not shown, see e.g., circumferential slot 120 of FIG. 1) in the base enclosure.

The top enclosure 452 is then rotated with reference to the base enclosure from its initial unlocked rotational orientation to a locked rotational orientation, as illustrated by arrow 458. In the locked rotational orientation, the pins protruding inward from the round interior perimeter of side wall 456 are fully seated within the circumferential slots in the base enclosure and spring-loaded magnetic pins are engaged with seats in the top enclosure 452 to prevent the top enclosure 452 from rotating with reference to the base enclosure.

A bottom key 434 is illustrated as attached to a bottom-side of the base enclosure and rotationally locked to the base enclosure. The bottom key 434 includes handles 446, 448 arranged at a perimeter of the bottom key 434 that allow a user to hold the base enclosure rotationally in place as the handles 446, 448 are compressed against a hard surface, such as a table or desk. This may aid the user in rotating the top enclosure 452 with reference to the base enclosure (e.g., by preventing the base enclosure from rotating with the top enclosure 452) to achieve the locked rotational orientation. A rotational stop 450 is also arranged at the perimeter of the bottom key 434 to provide a visual and/or tactile rotational alignment tool so that an associated top key (not shown, see e.g., top key 560 of FIG. 5) is rotationally aligned in a manner that unlocks the rotational magnetic locking features.

Once the computing device 400 is placed in the locked rotational orientation, the bottom key 434 may be removed from the base enclosure and the computing device 400 may be put into service. In some implementations, the bottom key 434 is omitted. For example, the base enclosure may be permanently mounted to a table or desk, which takes the place of the bottom key 434. For further example, a user may be able to grip the bottom key 434 and the top key independently and sufficiently to rotate the top enclosure 452 with reference to the base enclosure without use of the bottom key 434.

Figure 5:
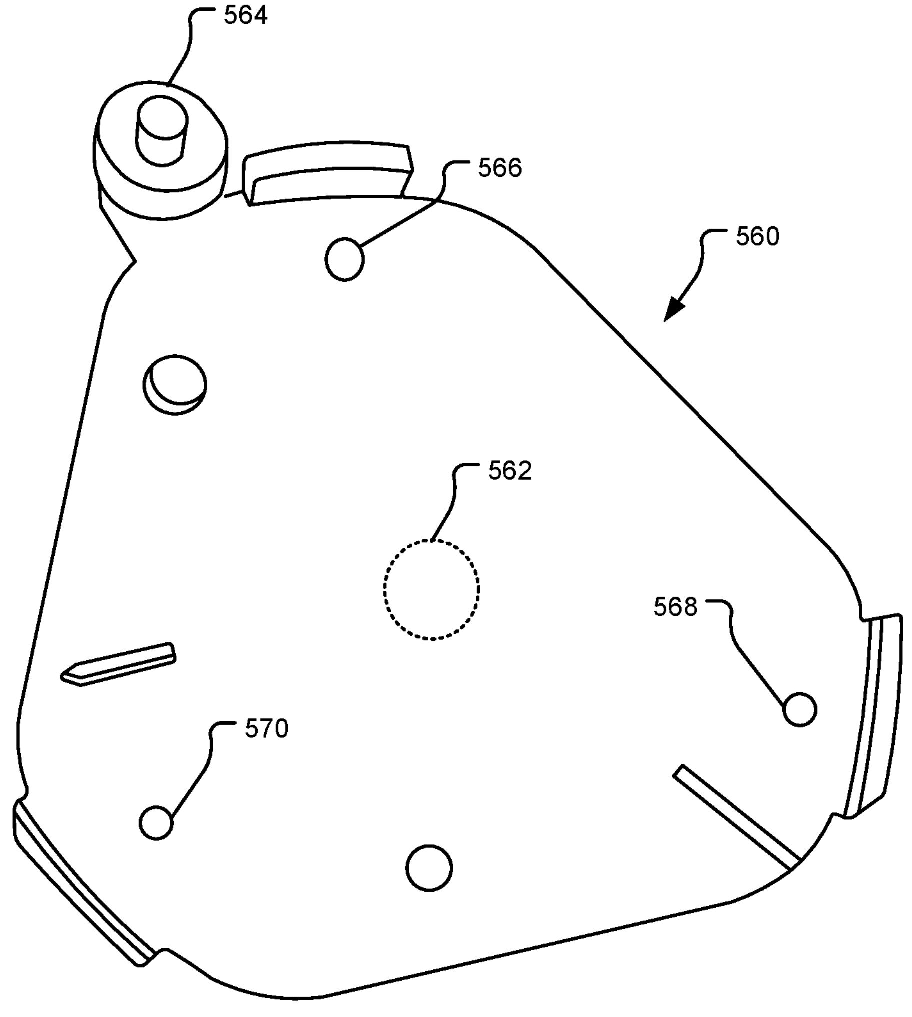
FIG. 5 illustrates an example top key for a top enclosure.

FIG. 5 illustrates an example top key 560 for a top enclosure. The top enclosure is fit to a base enclosure and selectively locked to form a computing device. The top key 560 is a generally planar component that is selectively attached to a top-side of the top enclosure. While the top key 560 is depicted as generally triangular in outline shape, other shapes could function similarly so long as the features discussed below are similarly incorporated. The top key 560 is magnetically attracted to the top enclosure, either via top key magnet 562 embedded within a center of the top key 560 (illustrated in broken lines as it may be hidden from view), a similar magnet embedded within a center of the top enclosure (e.g., top enclosure magnet 662 of FIG. 6), or potentially both magnets. The top key 560 or the top enclosure may be also either ferromagnetic (e.g., steel) to provide the attraction.

While the top key magnet 562 holds the top key 560 against the top-side of the top enclosure, it does not rotationally align the top key 560 on the top enclosure. To serve that purpose, a rotational stop 564 positioned at the perimeter of the top key 560 provides a visual and/or tactile rotational alignment tool when used in conjunction with a corresponding rotational stop of an associated bottom key (not shown, see e.g., rotational stop 350 of bottom key 334 of FIG. 3). Aligning the rotational stops aligns the top key 560 on the top enclosure with a matched set of rotational magnetic locking features in the top enclosure and the base enclosure of the computing device, and triggers the rotational magnetic locking features to unlock.

Specifically, the top key 560 includes a set of key magnets 566, 568, 570 arranged about a perimeter of the top key 560. The key magnets 566, 568, 570 align with rotational magnetic locking feature in the base enclosure and the top enclosure when the top key 560 is aligned (or responsive at least to alignment of the top key 560) on the top enclosure, as discussed above. This alignment of the key magnets 566, 568, 570 with the rotational magnetic locking features unlocks the base rotational magnetic locking features (not shown, see e.g., base rotational magnetic locking features 110, 112, 114 of FIG. 1) from corresponding top rotational magnetic locking features (not shown, see e.g., top rotational magnetic locking features 486, 488, 490 in top enclosure 452 of FIG. 4).

In an example implementation, the base rotational magnetic locking features includes spring-loaded magnetic pins, the top rotational magnetic locking features include seats for the spring-loaded magnetic pins, and the key magnets 566, 568, 570 repel the spring-loaded magnetic pins out of their respective seats when the top key 560 is placed (or responsive at least to placement of the top key 560) at the predefined position over the top enclosure.

In another example implementation, the top rotational magnetic locking feature includes spring-loaded magnetic pins, the base rotational magnetic locking feature includes seats for the spring-loaded magnetic pins, and the key magnets 566, 568, 570 attract the spring-loaded magnetic pins by pulling them out of their respective seats when the top key 560 is placed (or responsive at least to placement of the top key 560) at the predefined position over the top enclosure. In some implementations, the top key 560 may be magnetically attached to a corresponding bottom key (not shown, see e.g., bottom key 234 of FIG. 2) for easy storage and transport.

FIG. 6 illustrates an example top key 660 aligned over a top enclosure 652 that unlocks the top enclosure 652 from an underlying base enclosure (not shown, see e.g., base enclosure 102 of FIG. 1) and rotation of the top enclosure 652 from a locked rotational orientation to an unlocked rotational orientation with reference to the underlying base enclosure. The top key 660 is placed on the top enclosure 652 and rotated as needed to achieve proper alignment using a visual and/or tactile rotational alignment tool 672. The rotational alignment tool 672 includes a rotational stop 664 on the top key 660 and a corresponding rotational stop 650 of an associated bottom key 634. Aligning the rotational stops 650, 664 along axis 674 aligns the top key 660 on the top enclosure 652 with a matched set of rotational magnetic locking features in the top enclosure 652 and the base enclosure, and triggers the rotational magnetic locking features to unlock.

Once the rotational magnetic locking features are unlocked, the top enclosure 652 may be rotated with reference to the base enclosure from a locked rotational orientation to an unlocked rotational orientation, as illustrated by arrow 676. Specifically, a use holds the rotational alignment tool 672 in position so that it remains aligned about axis 674 and may also hold the bottom key 634 using one or both of its handles 646, 648 while simultaneously rotating the top enclosure 652 counterclockwise. The base enclosure remains fixed to the bottom key 634 and the top enclosure 652 is moved from the locked rotational orientation to the unlocked rotational orientation. Once in the unlocked rotational orientation, the top enclosure 652 may be lifted linearly away from the base enclosure, as illustrated by arrow 678. The top key 660 may then be removed from the top enclosure 652 and the bottom key 634 may be removed from the base enclosure.

In some implementations, the bottom key 634 may be omitted. In such cases, to properly align the top key 660 with the top enclosure 652, the top enclosure 652 may include an additional alignment feature (e.g., a magnet) that biases the top key 660 to an aligned orientation on the top enclosure 652.

Figure 7A:
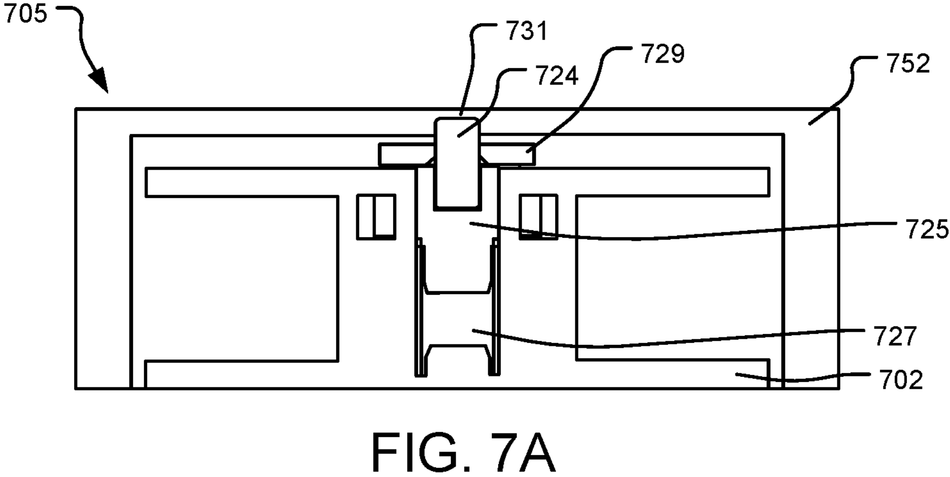
FIG. 7A illustrates a cross section of an example rotational magnetic locking mechanism in a locked state.

FIG. 7A illustrates a cross section of an example rotational magnetic locking mechanism 705 in a locked state. The mechanism 705 includes a base rotational magnetic locking feature embedded within a perimeter of a base enclosure 702 and a top rotational magnetic locking feature embedded within a perimeter of a top enclosure 752. The base rotational magnetic locking feature includes a spring-loaded magnetic pin 724 seated in a plunger 725 that is spring-biased using spring 727 to the depicted protruding orientation with reference to a surrounding pin housing. The magnetic pin 724 protrudes through a plunger cap 729 that keeps the magnetic pin 724 centered as it protrudes out of the plunger 725. The top rotational magnetic locking feature includes a seat 731 in the top enclosure 652 for the spring-loaded magnetic pin 724. In the depicted locked state, the spring-loaded magnetic pin 724 is engaged with the seat 731 in the top enclosure to prevent the top enclosure 752 from rotating with reference to the base enclosure 702.

Figure 7B:
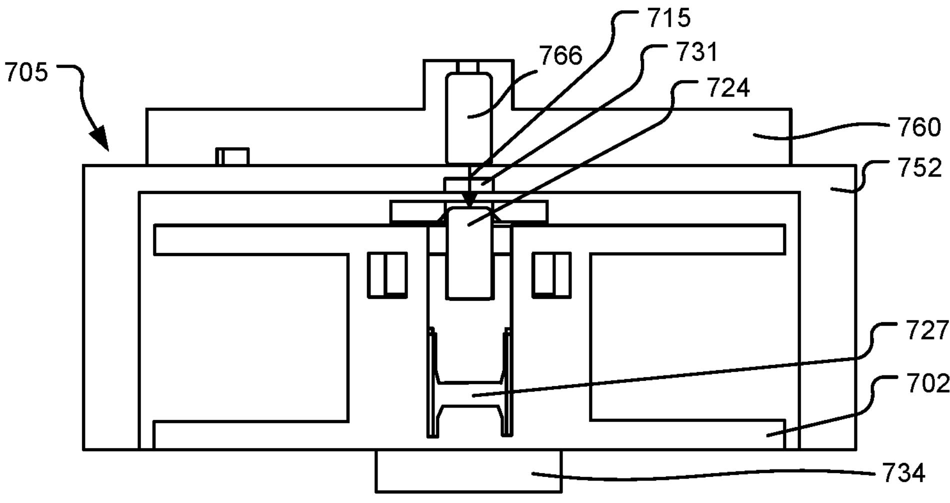
FIG. 7B illustrates a cross section of the example rotational magnetic locking mechanism of FIG. 7A in an unlocked state.

FIG. 7B illustrates a cross section of the example rotational magnetic locking mechanism 705 of FIG. 7A in an unlocked state. A bottom key 734 is selectively attached to a bottom-side of the base enclosure 702. A top key 760 is selectively attached to a top-side of the top enclosure 752. The top key 760 includes an unlock magnet 766 embedded within the top key 760 that is aligned with the base and top rotational magnetic locking features of the mechanism 705. The unlock magnet 766 and the magnetic pin 724 have polar orientations that push away from one another. This causes the magnetic pin 724 to overcome the force applied by the spring 727 and retract, exiting the seat 731 as illustrated by arrow 715. With the magnetic pin 724 disengaged from the seat 731, the top enclosure 752 is free to rotate with reference to the base enclosure 702 and move to an unlocked rotational orientation.

While only one rotational magnetic locking mechanism 705 is illustrated in FIGS. 7A and 7B, the top key 760 may include an array of rotational magnetic locking mechanisms spaced apart on the top key 760 that corresponds to a similar arrangement of spring-loaded magnetic pins in the base enclosure 702. In some implementations, the positioning and polar orientations of the array of rotational magnetic locking mechanisms may be used as a security measure that would prevent or reduce the likelihood of a user being able to disengage all the rotational magnetic locking mechanisms simultaneously using a magnet or series of magnets in place of the top key 760. Further, with a repelling magnetic action being used, a collection of separate magnets would be difficult to use in place of the top key 760 as they would be individually pushed away from locations where they unlock one of the rotational magnetic locking mechanisms. As such, while a singular rotational magnetic locking mechanism and corresponding unlock magnet 766 in the top key 760 is shown in FIGS. 7A and 7B, any number of rotational magnetic locking mechanisms and corresponding unlock magnets may be used to achieve a desired level of security and overall performance (e.g., FIG. 1 illustrates three base rotational magnetic locking features 110, 112, 114, FIG. 4A illustrates a corresponding three top rotational magnetic locking features 486, 488, 490, and FIG. 5 illustrates a corresponding three key magnets 566, 568, 570). These base rotational magnetic locking features, top rotational magnetic locking features, and key magnets are all equidistantly spaced as shown. Other implementations may not equidistantly space these features, particularly if necessary to meet packaging requirements within a computing device.

The magnetic locking mechanisms disclosed herein are technically advantageous over the existing solutions in that they provide selective authorized access to an interior of a computing device, without utilizing exposed fasteners, which have a variety of disadvantages as described above. The magnetic locking mechanisms disclosed herein further permits a rapid assembly and disassembly process for an authorized user that possesses the top key 760 (or tooling that includes the top key 760), which is technically advantageous over existing solutions that adopt multiple screwed connections, the sum of which may take significantly longer to assemble and disassemble. Further, screw fasteners add additional part cost, which can be avoided by the presently disclosed magnetic locking mechanisms. Still further, the presently disclosed magnetic locking mechanisms avoid the additional expense of a finishing cover (e.g., to conceal screw holes), as well as the reduced recyclability of an end product that incorporates a finishing cover. Further still, as the base enclosure 702 and the top enclosure 752 can quickly and easily be separated using the top key 760, the presently disclosed magnetic locking mechanisms support recyclability of the computing device by allowing its constituent components to be more quickly and easily separated into their respective recycling streams. A computing device incorporating the magnetic locking mechanisms disclosed herein is further technically advantageous over existing computing devices as it is secure and relatively tamper-proof so long as the top key 760 is not available. The absence of exposed fasteners or other exposed features such as that found in existing computing devices that would otherwise invite tampering discourages the same of the computing device.

Figure 8:
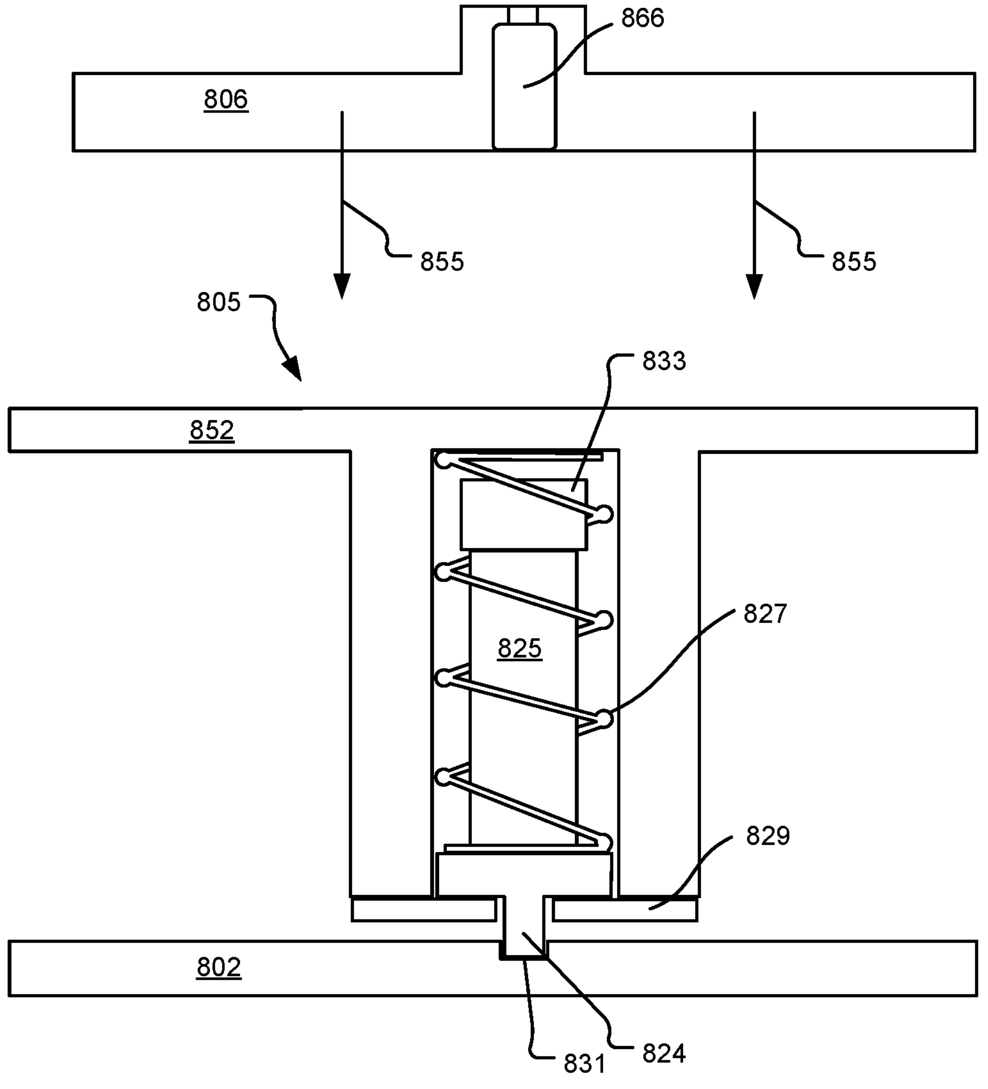
FIG. 8 illustrates a cross section of another example rotational magnetic locking mechanism in a locked state.

FIG. 8 illustrates a cross section of another example rotational magnetic locking mechanism 805 in a locked state. The mechanism 805 includes a base rotational magnetic locking feature embedded within a perimeter of a base enclosure 802 and a top rotational magnetic locking feature embedded within a perimeter of a top enclosure 852. The top rotational magnetic locking feature includes a spring-loaded pin 824 seated to a plunger 825 that is spring-biased against pre-load cap 829 using spring 827 to the depicted protruding orientation with reference to a surrounding pin housing. The pin 824 protrudes through the pre-load cap 829 that also keeps the pin 824 centered as it protrudes out of the plunger 825. The base rotational magnetic locking feature includes a seat 831 in the base enclosure 802 for the pin 824. In the depicted locked state, the pin 824 is engaged with the seat 831 in the base enclosure 802 to prevent the top enclosure 852 from rotating with reference to the base enclosure 802.

A top key 806 is selectively attached to a top-side of the top enclosure 852. The top key 806 includes an unlock magnet 866 embedded within the top key 806 that is aligned with the base and top rotational magnetic locking features of the mechanism 805. When the top key 806 is placed (or responsive at least to placement of the key 806) upon the top enclosure 852, as illustrated by arrows 855, the unlock magnet 866 attracts a steel (or other ferromagnetic) cap 833 attached to an end of the plunger 825 opposite the pin 824. This causes the pin 824 to overcome the force applied by the spring 827 and retract, exiting the seat 831. When the pin 824 is disengaged from the seat 831 (or responsive at least to disengagement of the pin 824 from the seat 831), the top enclosure 852 is free to rotate with reference to the base enclosure 802 and move to an unlocked rotational orientation.

As compared to the mechanism 705 of FIGS. 7A&B, the mechanism 805 of FIG. 8 relies on magnetic attraction rather than repulsion to unlock the base enclosure 802 from the top enclosure 852. This allows for one or both of the unlock magnet 866 and the cap 833 to be magnetic. This also allows gravity to be used to supplement or perhaps replace the spring 827 In other implementations, the unlock magnet is attached to the plunger and the ferromagnetic cap is embedded within the top key 806.

The number, polar orientation, and placement of each of the individual magnets within the top key 806, base enclosure 802, and/or top enclosure 852 can be varied to increase the difficulty of reproducing a magnetic key that would serve to lock and unlock the rotational magnetic locking mechanism 805. This complexity allows for multiple varied keys in use across a system of numerous computing devices. These keys are truly used as such because only the correct key will open each specific computing device. This is technically advantageous in that increases security of a corresponding computing device in that possession of an authorized key is needed to open the computing device.

Figure 9:
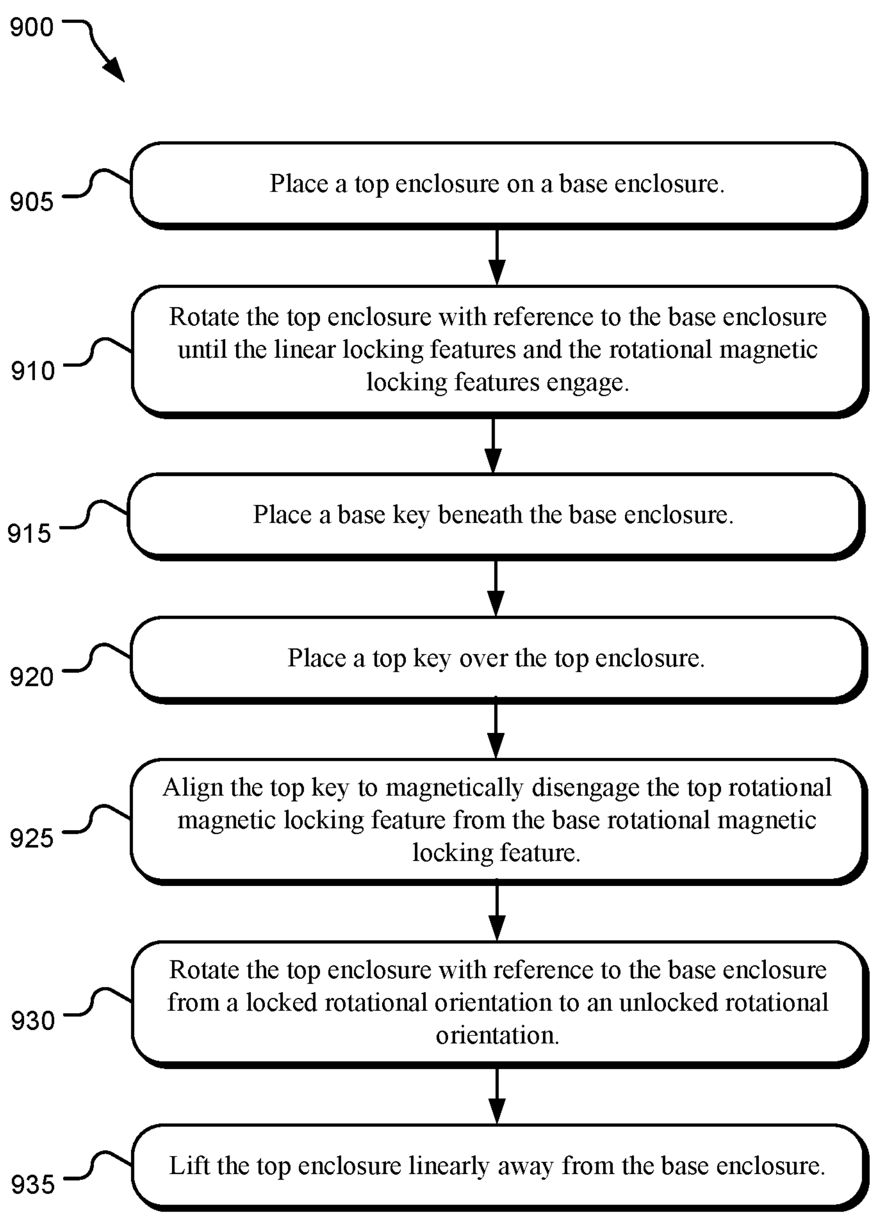
FIG. 9 illustrates example operations for attaching a top enclosure to a base enclosure of a computing device and removing the top enclosure from the base enclosure using linear locking features and rotational magnetic locking features.

FIG. 9 illustrates example operations 900 for attaching a top enclosure to a base enclosure of a computing device and removing the top enclosure from the base enclosure using linear locking features and rotational magnetic locking features. The top enclosure includes two or more top linear locking features and one or more top rotational magnetic locking features. The base enclosure includes two or more base linear locking features and one or more base rotational magnetic locking features. The top linear locking features and the base linear locking features selectively lock together to prevent the top enclosure from being lifted linearly from the base enclosure. The top rotational magnetic locking features and the base rotational magnetic locking features selectively lock together to prevent the top enclosure from being rotated with reference to the base enclosure. The prevents the computing device from being moved from a locked rotational orientation to an unlocked rotational orientation.

A first placing operation 905 places the top enclosure on the base enclosure. A first rotating operation 910 rotates the top enclosure with reference to the base enclosure until the top linear locking features engage the base linear locking features and until the top rotational magnetic locking features engages the base rotational magnetic locking features, thereby locking the top enclosure to the base enclosure. Operations 905, 910 are performed to assemble a computing device using linear locking features and rotational magnetic locking features. The following operations 915-930 are performed to disassemble the computing device.

A second placing operation 915 places a base key beneath the base enclosure. The base key includes alignment protrusions that engage alignment recesses in the base enclosure. A third placing operation 920 places a top key over the top enclosure. An aligning operation 925 aligns the top key to magnetically disengage the top rotational magnetic locking feature from the base rotational magnetic locking feature. In some implementations, the aligning operation 925 aligns a base key rotational stop with a top key rotational stop to achieve the proper alignment to magnetically disengage the top rotational magnetic locking feature from the base rotational magnetic locking features.

A second rotating operation 930 rotates the top enclosure with reference to the base enclosure from a locked rotational orientation to an unlocked rotational orientation that disengages the top linear locking features from the base linear locking features. A lifting operation 935 lifts the top enclosure linearly away from the base enclosure. Maintenance or repair operations can then be performed on internal components of the computing device. The operations 900 may be performed manually by assembly or service personnel, or mechanically by assembly or dis-assembly equipment as part of a pick-and-place process.

The operations making up the embodiments of the presently disclosed technology described herein are referred to variously as operations, steps, objects, method steps, or modules. Furthermore, the operations may be performed in any order, adding or omitting operations as desired, unless explicitly claimed otherwise or a specific order is inherently necessitated by the claim language.

An implementation of the presently disclosed technology includes a computing device comprising a base enclosure and a top enclosure. The base enclosure includes a round exterior perimeter and an interior recess, two or more base linear locking features arranged about the exterior perimeter of the base enclosure, and a base rotational magnetic locking feature also arranged about the exterior perimeter of the base enclosure. The top enclosure includes a round interior perimeter fit over the base enclosure, the round exterior perimeter of the base enclosure encircling the round interior perimeter of the top enclosure. The top enclosure further includes two or more top linear locking features arranged about the interior perimeter of the top enclosure, the top linear locking features to selectively engage with the base linear locking features to prevent the top enclosure from lifting linearly away from the base enclosure at a locked rotational orientation of the top enclosure with reference to the base enclosure. The top enclosure further includes a top rotational magnetic locking feature to selectively engage with the base rotational magnetic locking feature to selectively prevent the top enclosure from rotating with reference to the base enclosure.

In some implementations, the computing device further comprises a top key to selectively interface with the top enclosure, the top key to disengage the top rotational magnetic locking feature from the base rotational magnetic locking feature when placed at a predefined position over the top enclosure, thereby permitting the top enclosure to rotate to an unlocked rotational orientation with reference to the base enclosure.

In some implementations, the top enclosure is free to be lifted linearly away from the base enclosure in the unlocked rotational orientation using the top key.

In some implementations, the top key includes a key magnet that is aligned with the base rotational magnetic locking feature and the top rotational magnetic locking feature when the top key is placed at the predefined position over the top enclosure, and wherein the key magnet drives the top rotational magnetic locking feature to disengage from the base rotational magnetic locking feature.

In some implementations, the base rotational magnetic locking feature includes a spring-loaded magnetic pin, the top rotational magnetic locking feature includes a seat for the spring-loaded magnetic pin, and the key magnet repels the spring-loaded magnetic pin out of its seat when the top key is placed at the predefined position over the top enclosure.

In some implementations, the top rotational magnetic locking feature includes a spring-loaded magnetic pin, the base rotational magnetic locking feature includes a seat for the spring-loaded magnetic pin, and the key magnet attracts the spring-loaded magnetic pin pulling it out of its seat when the top key is placed at the predefined position over the top enclosure.

In some implementations, the computing device further comprises a bottom key to selectively interface with the base enclosure, the bottom key to provide a handle to prevent rotation of the base enclosure coincident with rotation of the top enclosure.

In some implementations, the base enclosure and the top enclosure in combination form a cavity for enclosing components of the computing device.

In some implementations, the base linear locking features each comprise circumferential slot in the round exterior perimeter of the base enclosure and an access point to the circumferential slot, and wherein the top linear locking features each comprise a pin protruding inward from the round interior perimeter of the top enclosure, wherein each pin engages with a circumferential slot in the locked rotational orientation, and wherein each pin is free to exit a circumferential slot via it's access point in an unlocked rotational orientation of the top enclosure with reference to the base enclosure.

In some implementations, the base rotational magnetic locking feature comprises a spring-loaded magnetic pin, and wherein the top rotational magnetic locking feature comprises a seat in the top enclosure for the spring-loaded magnetic pin, wherein in the locked rotational orientation, the spring-loaded magnetic pin selectively engages with the seat in the top enclosure to prevent the top enclosure from rotating with reference to the base enclosure.

In some implementations, multiple base rotational magnetic locking features are equidistantly spaced about the exterior perimeter of the base enclosure, and wherein multiple top rotational magnetic locking features are equidistantly spaced within the top enclosure.

In some implementations, the base enclosure further includes one or more anti-rattle features that close a tolerance between the base enclosure and the top enclosure.

In some implementations, the base enclosure includes three or more base linear locking features arranged about the exterior perimeter of the base enclosure and three or more base rotational magnetic locking features also arranged about the exterior perimeter of the base enclosure, and wherein the top enclosure includes three or more top linear locking features arranged about the interior perimeter of the top enclosure and three or more top rotational magnetic locking features.

An implementation of the presently disclosed technology includes a method of using a magnetic locking mechanism to detach a top enclosure from a base enclosure of a computing device. The method comprises placing a top key over the top enclosure including two or more top linear locking features and a top rotational magnetic locking feature, the top enclosure locked to a base enclosure including two or more base linear locking features and a base rotational magnetic locking feature; aligning the top key to magnetically disengage the top rotational magnetic locking feature from the base rotational magnetic locking feature; rotating the top enclosure with reference to the base enclosure from a locked rotational orientation to an unlocked rotational orientation that disengages the top linear locking features from the base linear locking features; and lifting the top enclosure linearly away from the base enclosure.

In some implementations, the method further comprises placing a base key beneath the base enclosure prior to the aligning operation, wherein the aligning operation aligns a base key rotational stop with a top key rotational stop.

In some implementations, the method further comprises placing the top enclosure on the base enclosure and rotating the top enclosure with reference to the base enclosure until the two or more top linear locking features engage the two or more base linear locking features and until the top rotational magnetic locking feature engages the base rotational magnetic locking feature, thereby locking the top enclosure to the base enclosure.

An implementation of the presently disclosed technology includes a computing device comprising a base enclosure and a top enclosure. The base enclosure includes a round exterior perimeter and an interior recess, two or more base linear locking features arranged about the exterior perimeter of the base enclosure, and a base rotational magnetic locking feature also arranged about the exterior perimeter of the base enclosure. The top enclosure includes a round interior perimeter fit over the base enclosure, the round exterior perimeter of the base enclosure encircling the round interior perimeter of the top enclosure. The top enclosure further includes two or more top linear locking features arranged about the interior perimeter of the top enclosure, the top linear locking features to selectively engage with the base linear locking features to prevent the top enclosure from lifting linearly away from the base enclosure at a locked rotational orientation of the top enclosure with reference to the base enclosure; and a top rotational magnetic locking feature to selectively engage with the base rotational magnetic locking feature to selectively prevent the top enclosure from rotating with reference to the base enclosure. The computing device further comprises a bottom key to selectively interface with the base enclosure, the bottom key to provide a handle to prevent rotation of the base enclosure coincident with rotation of the top enclosure. The computing device further comprises a top key to selectively interface with the top enclosure, the top key to disengage the top rotational magnetic locking feature from the base rotational magnetic locking feature responsive at least to its placement at a predefined position over the top enclosure, thereby permitting the top enclosure to rotate to an unlocked rotational orientation with reference to the base enclosure.

In some implementations, the top key includes a key magnet that is aligned with the base rotational magnetic locking feature and the top rotational magnetic locking feature when the top key is placed at the predefined position over the top enclosure, and wherein the key magnet drives the top rotational magnetic locking feature to disengage from the base rotational magnetic locking feature.

In some implementations, the base rotational magnetic locking feature includes a spring-loaded magnetic pin, the top rotational magnetic locking feature includes a seat for the spring-loaded magnetic pin, and the key magnet repels the spring-loaded magnetic pin out of its seat when the top key is placed at the predefined position over the top enclosure.

In some implementations, the top rotational magnetic locking feature includes a spring-loaded magnetic pin, the base rotational magnetic locking feature includes a seat for the spring-loaded magnetic pin, and the key magnet attracts the spring-loaded magnetic pin pulling it out of its seat when the top key is placed at the predefined position over the top enclosure.

The above specification, examples, and data provide a complete description of the structure and use of exemplary implementations of the presently disclosed technology. Since many implementations of the presently disclosed technology can be made without departing from the spirit and scope of the invention, the invention resides in the claims hereinafter appended. Furthermore, structural features of the different implementations may be combined in yet another implementation without departing from the recited claims.

What is claimed is:

1. A computing device comprising:

a base enclosure including a round exterior perimeter and an interior recess, the base enclosure including:

two base linear locking features arranged about the exterior perimeter of the base enclosure; and a base rotational magnetic locking feature also arranged about the exterior perimeter of the base enclosure; and a top enclosure including a round interior perimeter fit over the base enclosure, the round exterior perimeter of the base enclosure encircling the round interior perimeter of the top enclosure, the top enclosure including:

two top linear locking features arranged about the interior perimeter of the top enclosure, the top linear locking features to selectively engage with the base linear locking features to prevent the top enclosure from lifting linearly away from the base enclosure at a locked rotational orientation of the top enclosure with reference to the base enclosure; and a top rotational magnetic locking feature to selectively engage with the base rotational magnetic locking feature to selectively prevent the top enclosure from rotating with reference to the base enclosure, the top linear locking features being free to selectively disengage from the base linear locking features by rotating with reference to the base enclosure as the top rotational magnetic locking feature is selectively disengaged.

2. The computing device of claim 1, further comprising:

a top key to selectively interface with the top enclosure, the top key to disengage the top rotational magnetic locking feature from the base rotational magnetic locking feature responsive at least to its placement at a predefined position over the top enclosure, thereby permitting the top enclosure to rotate to an unlocked rotational orientation with reference to the base enclosure.

3. The computing device of claim 2, wherein the top enclosure is free to be lifted linearly away from the base enclosure in the unlocked rotational orientation using the top key.

4. The computing device of claim 2, wherein the top key includes a key magnet that is aligned with the base rotational magnetic locking feature and the top rotational magnetic locking feature responsive at least to placement of the top key at the predefined position over the top enclosure, and wherein the key magnet drives the top rotational magnetic locking feature to disengage from the base rotational magnetic locking feature.

5. The computing device of claim 4, wherein the base rotational magnetic locking feature includes a spring-loaded magnetic pin, the top rotational magnetic locking feature includes a seat for the spring-loaded magnetic pin, and the key magnet repels the spring-loaded magnetic pin out of its seat responsive at least to placement of the top key at the predefined position over the top enclosure.

6. The computing device of claim 4, wherein the top rotational magnetic locking feature includes a spring-loaded magnetic pin, the base rotational magnetic locking feature includes a seat for the spring-loaded magnetic pin, and the key magnet attracts the spring-loaded magnetic pin pulling it out of its seat responsive at least to placement of the top key at the predefined position over the top enclosure.

7. The computing device of claim 1, further comprising:

a bottom key to selectively interface with the base enclosure, the bottom key to provide a handle to prevent rotation of the base enclosure coincident with rotation of the top enclosure.

8. The computing device of claim 1, wherein the base enclosure and the top enclosure in combination form a cavity for enclosing components of the computing device.

9. The computing device of claim 1, wherein the base linear locking features each comprise a circumferential slot in the round exterior perimeter of the base enclosure and an access point to the circumferential slot, and wherein the top linear locking features each comprise a pin protruding inward from the round interior perimeter of the top enclosure, wherein each pin engages with a circumferential slot in the locked rotational orientation, and wherein each pin is free to exit a circumferential slot via it's access point in an unlocked rotational orientation of the top enclosure with reference to the base enclosure.

10. The computing device of claim 1, wherein the base rotational magnetic locking feature comprises a spring-loaded magnetic pin, and wherein the top rotational magnetic locking feature comprises a seat in the top enclosure for the spring-loaded magnetic pin, wherein in the locked rotational orientation, the spring-loaded magnetic pin selectively engages with the seat in the top enclosure to prevent the top enclosure from rotating with reference to the base enclosure.

11. The computing device of claim 1, wherein multiple base rotational magnetic locking features are equidistantly spaced about the exterior perimeter of the base enclosure, and wherein multiple top rotational magnetic locking features are equidistantly spaced within the top enclosure.

12. The computing device of claim 1, wherein the base enclosure further includes an anti-rattle feature that closes a tolerance between the base enclosure and the top enclosure.

13. The computing device of claim 1, wherein the base enclosure includes three base linear locking features arranged about the exterior perimeter of the base enclosure and three base rotational magnetic locking features also arranged about the exterior perimeter of the base enclosure, and wherein the top enclosure includes three top linear locking features arranged about the interior perimeter of the top enclosure and three top rotational magnetic locking features.

14. A method of using a magnetic locking mechanism to detach a top enclosure from a base enclosure of a computing device, comprising:

placing a top key over the top enclosure including two top linear locking features and a top rotational magnetic locking feature, the top enclosure locked to a base enclosure including two base linear locking features and a base rotational magnetic locking feature;

aligning the top key to magnetically disengage the top rotational magnetic locking feature from the base rotational magnetic locking feature;

rotating the top enclosure with reference to the base enclosure from a locked rotational orientation to an unlocked rotational orientation that disengages the top linear locking features from the base linear locking features; and lifting the top enclosure linearly away from the base enclosure.

15. The method of claim 14, further comprising:

placing a base key beneath the base enclosure prior to the aligning operation, wherein the aligning operation aligns a base key rotational stop with a top key rotational stop.

16. The method of claim 14, further comprising:

placing the top enclosure on the base enclosure; and rotating the top enclosure with reference to the base enclosure until the top linear locking features engage the base linear locking features and until the top rotational magnetic locking feature engages the base rotational magnetic locking feature, thereby locking the top enclosure to the base enclosure.

17. A computing device comprising:

a base enclosure including a round exterior perimeter and an interior recess, the base enclosure including:

two base linear locking features arranged about the exterior perimeter of the base enclosure; and a base rotational magnetic locking feature also arranged about the exterior perimeter of the base enclosure; and a top enclosure including a round interior perimeter fit over the base enclosure, the round exterior perimeter of the base enclosure encircling the round interior perimeter of the top enclosure, the top enclosure including:

two top linear locking features arranged about the interior perimeter of the top enclosure, the top linear locking features to selectively engage with the base linear locking features to prevent the top enclosure from lifting linearly away from the base enclosure at a locked rotational orientation of the top enclosure with reference to the base enclosure;

a top rotational magnetic locking feature to selectively engage with the base rotational magnetic locking feature to selectively prevent the top enclosure from rotating with reference to the base enclosure;

a bottom key to selectively interface with the base enclosure, the bottom key to provide a handle to prevent rotation of the base enclosure coincident with rotation of the top enclosure; and a top key to selectively interface with the top enclosure, the top key to disengage the top rotational magnetic locking feature from the base rotational magnetic locking feature responsive at least to its placement at a predefined position over the top enclosure, thereby permitting the top enclosure to rotate to an unlocked rotational orientation with reference to the base enclosure.

18. The computing device of claim 17, wherein the top key includes a key magnet that is aligned with the base rotational magnetic locking feature and the top rotational magnetic locking feature responsive at least to placement of the top key at the predefined position over the top enclosure, and wherein the key magnet drives the top rotational magnetic locking feature to disengage from the base rotational magnetic locking feature.

19. The computing device of claim 18, wherein the base rotational magnetic locking feature includes a spring-loaded magnetic pin, the top rotational magnetic locking feature includes a seat for the spring-loaded magnetic pin, and the key magnet repels the spring-loaded magnetic pin out of its seat responsive at least to placement of the top key at the predefined position over the top enclosure.

20. The computing device of claim 18, wherein the top rotational magnetic locking feature includes a spring-loaded magnetic pin, the base rotational magnetic locking feature includes a seat for the spring-loaded magnetic pin, and the key magnet attracts the spring-loaded magnetic pin pulling it out of its seat responsive at least to placement of the top key at the predefined position over the top enclosure.

* * * * *